United States Patent [19]

Adesko et al.

[11] Patent Number: 5,000,809
[45] Date of Patent: Mar. 19, 1991

[54] LAMINATION COATING PROCESS USING POLYESTERURETHANE COATING

[75] Inventors: Paul L. Adesko, Bloomfield Hills, Mich.; Jeffery W. Johnson, Wilmington, Del.; Patrick L. Spain, Lowell; Keith L. Truog, Crown Point, both of Ind.

[73] Assignee: E. I Du Pont de Nemours and Company, Wilmington, Del.

[21] Appl. No.: 455,885

[22] Filed: Dec. 21, 1989

[51] Int. Cl.$^5$ .................................. V32B 31/04
[52] U.S. Cl. ........................ 156/230; 156/235; 156/238; 156/239; 156/242; 156/245; 156/246; 156/247; 156/249
[58] Field of Search ............... 156/230, 235, 238, 239, 156/242, 245, 246, 247, 249, 212

[56] References Cited

U.S. PATENT DOCUMENTS

| | | | |
|---|---|---|---|
| 4,280,979 | 7/1981 | Dunleavy et al. | 156/242 |
| 4,818,589 | 4/1989 | Johnson et al. | 156/238 |
| 4,838,973 | 6/1989 | Mentzer et al. | 156/212 |
| 4,913,760 | 4/1990 | Benson et al. | 156/246 |
| 4,936,936 | 6/1990 | Rohrbacher | 156/245 |

*Primary Examiner*—Caleb Weston
*Attorney, Agent, or Firm*—Hilmar L. Fricke

[57] ABSTRACT

A process for forming a composite that is useful as an exterior vehicle part in which a layer of a coating composition is applied to a flexible smooth glossy polymeric carrier sheet and dried and laminated under heat and pressure to a flexible polymeric substrate to form a laminate, the carrier sheet is removed and the laminate is thermoformed into a three dimensional structure and a rigid thermoformable plastic is adhered to the thermoformed laminate to form the composite; the coating compsition used in the process that forms the exterior finish on the composite has a film forming binder which is in an organic liquid carrier is of a polyesterurethane and a multifunctional crosslinking agent of an epoxy compound or an organic polyisocyanate; wherein
the polyesterurethane is formed by reacting a hydroxy functional polyester with a hydroxy containing carboxylic acid and an organic polyisocyanate.

43 Claims, 3 Drawing Sheets

LAMINATION COATING PROCESS USING POLYESTERURETHANE COATING

BACKGROUND OF THE INVENTION

This invention is related to a laminations coating process and in particular to such a process that utilizes a polyesterurethane coating composition.

Many exterior auto and truck parts such as fenders, quarter panels, doors, trim parts, bumpers, fender extensions and other exterior parts are formed of moldable plastic or polymeric materials such as thermoplastic polymers or reinforced polymeric materials. These parts are currently being used because of their corrosion resistance, resistance to permanent deformation on impact and are lighter than metal parts which they replace. Typical moldable thermoplastic polymers that are being used for these parts and that can be easily and economically molded are, for example, polypropylene, polyethylene, ABS (acrylonitrile-butadiene-styrene polymers), polystyrene, and styrene-acrylonitrile copolymers. The lighter weight of these parts favorably affects the weight and fuel economy of the auto or truck made with these parts. Because of these advantages, these plastic parts are replacing metal parts of automobiles and trucks. Another advantage of the moldable polymers is that more intricate designs can be made in comparison to sheet metals giving the auto makers increased freedom in design of autos.

To reduce air pollution, automobile and truck manufactures need to reduce the amount of painting in the manufacturing process. It would be desirable to have a process that forms a plastic auto or truck part that has a high quality durable and weatherable finish whose color matches any painted sheet metal used to make the auto or truck and that can be attached directly in the assembly process and does not require further priming or painting. This would eliminate the costly and time consuming painting process with the associated pollution problems. It is an objective of this invention to provide a practical and economical process for laminating a coating composition to a plastic substrate and decorate this substrate and form a finish on the substrate that can be thermoformed and molded and results in a plastic part that has a finish with an excellent overall appearance, is durable and weatherable and the part is useful as an exterior automotive or truck part.

SUMMARY OF THE INVENTION

A process for forming a composite useful as an exterior vehicle body part that has the following steps:

a. a layer of a coating composition is applied to a flexible polymeric carrier sheet having a smooth glossy surface and the layer is dried;

b. the flexible polymeric carrier sheet is laminated under heat and pressure to a flexible thermoformable polymeric material with the coating layer of the polymeric carrier being adhered to the thermoformable polymeric material to form a laminate;

c. the polymeric carrier sheet is removed from the laminate whereby the surface of the coating layer substantially retains the glossy surface transferred to it from the polymeric carrier sheet;

d. the laminate is thermoformed under heat and pressure to form a three dimensional shaped preformed laminate; and e. a rigid synthetic resinous substrate is adhered to the flexible polymeric material of the thermoformed laminate to form the composite;

wherein the coating composition used in the process contains about 10-70% by weight binder solids and correspondingly about 90-30% by weight organic liquid carrier, wherein the binder contains (1) a carboxyl functional polyesterurethane having a weight average molecular weight of about 80,000 to 200,000 and is formed by reacting a hydroxy functional polyester, a hydroxy containing carboxylic acid and an organic polyisocyanate, wherein the hydroxy functional polyester is the reaction product of a diol of the formula HOROH and an acid of the formula $R^1(COOH)_2$ or an anhydride of such an acid where R is an aliphatic, cycloaliphatic or aromatic hydrocarbon radical having 2-6 carbon and $R^1$ is an aliphatic, cylcoaliphatic or aromatic hydrocarbon radical having 6-12 carbon atoms and (2) multifunctional crosslinking agent which is either a multifunctional aliphatic, cycloaliphatic or aromatic epoxy compound or a multifunctional organic polyisocyanate having at least three reactive isocyanate groups.

DETAILED DESCRIPTION OF THE INVENTION

Figure 1:
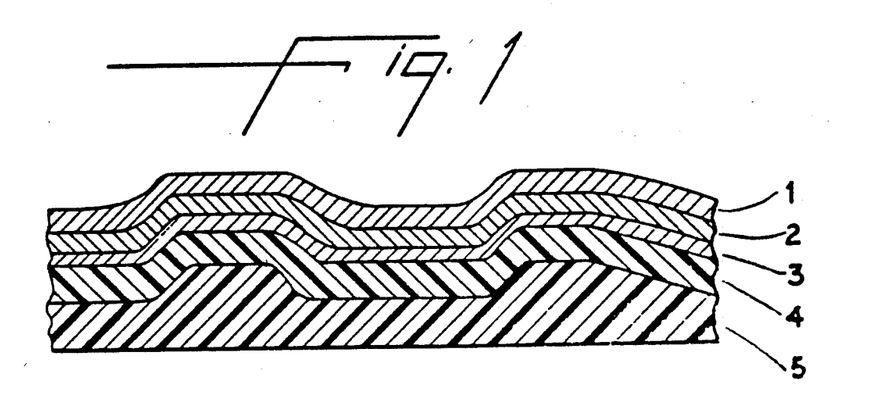
FIG. 1 shows a cross section of the composite made by the novel process of this invention.

A cross section of a composite is shown in FIG. 1. Layer 1 which is the exterior layer of the composite and is a cured layer of a coating composition that is a clear coating that has a glossy finish of automotive quality that has excellent weatherability, scratch and mar resistance and good gloss retention on weathering. Layer 1 is firmly adhered to paint layer 2 which is a pigmented cured layer of a coating composition. The composition of both layers is of automotive quality and will withstand processing conditions and forms a finish that is weatherable and will not crack and fade. The combination of layers 1 and 2 provides the composite with an automotive quality finish that has excellent gloss, high distinctness of image, abrasion and mar resistance, acid resistance and excellent weatherability including good gloss retention.

Layer 3 is a preferred optional layer or layers of a thin layer of a thermoplastic polymer, preferably an iminated acrylic polymer, that provides intercoat adhesion of the pigmented layer 2 to layer 4 which is a flexible thermoformable polymeric material. Layer 5 is a relatively thick rigid synthetic resinous substrate, preferable a thermoplastic injection molded polymeric material to which layer 4 is firmly adhered.

Preferably, the composite shown in FIG. 1 has the following thicknesses for each layer of the composite:

1. 10-125 micron thick layer of the glossy clear finish that is bonded firmly to 2. 5-75 micron thick layer of the pigment containing paint layer that is firmly bonded to 3. (optional) 1-20 micron thick layer or layers of a thermoplastic polymer that is firmly bonded to 4. 125-1250 micron thick layer of a flexible thermoformable material that is bonded to 5. 500-25,000 micron thick rigid layer of a rigid synthetic resinous material.

Figure 2:
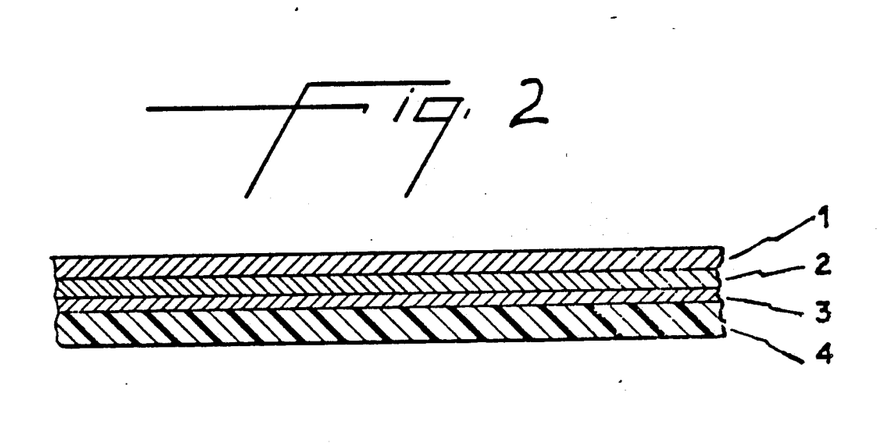
FIG. 2 shows a cross section of a thermoformable laminate or face sheet made by the novel process of this invention.

In the formation of the composite, a thermoformable laminate or face sheet is first formed. FIG. 2 shows a cross section of the laminate or face sheet. The face sheet is composed of layers 1-4 of the composite before being thermoformed.

The face sheet preferably has the following thickness for each of the layers used:

1. 10-125 micron thick layer of the glossy clear finish that is bonded firmly to 2. 5-75 micron thick layer of the pigment containing paint layer that is firmly bonded to 3. (optional) 1-20 micron thick layer or layers of a thermoplastic polymer that is firmly bonded to 4. 125-1250 micron thick layer of a flexible thermoformable material.

Figure 3:
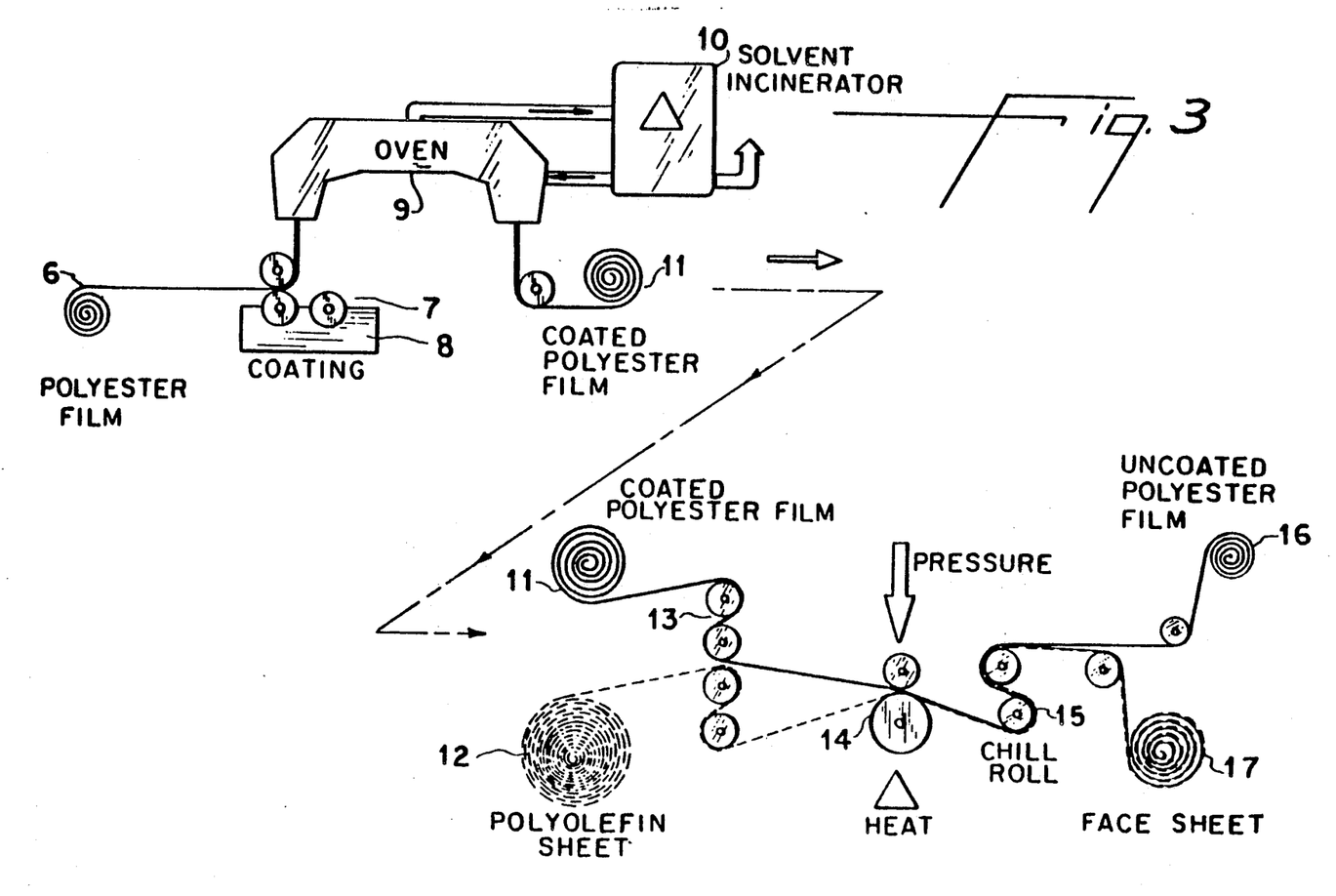
FIG. 3 shows roller coating of the coating composition onto a polyester film and the formation of a laminate or face sheet.

FIG. 3 shows a process for making the laminate or face sheet. A flexible polymeric carrier sheet, 6 preferably a polyester film, typically a "Mylar" 200A polyethylene terephthalate film about 50 microns thick, is fed through a 3 roll roller coater 7 containing a clear coating composition 8 of this invention and by reverse roller coating about a 10-125 micron thick coating (dry basis) is applied. Coating line speeds of about 5-25 meters/minute are used. The coated film is then passed through the oven 9, preferably having multiple heating zones; typically three heating zones are used. The first zone is at about 30°-50° C., the middle zone is at about 90°-100° C. and the last zone is at about 140-160° C. Typically, the oven is about 40 meters in length and the laminate is in the oven about 5 minutes. Generally, oven drying temperatures and line speed are adjusted so that the resulting clear layer is dried and at least partially cured before being wound onto the roll 11. A solvent incinerator 10 is used to incinerate solvent fumes from the coating composition. The coated film is then wound into roll 11. The roller coater 7 is filled with a pigmented coating composition instead of the clear composition and the process is repeated to apply about 5-75 micron thick coating (dry basis) of the pigmented coating or color coat over the clear coat layer on the film to form a polyester film having a clear coat layer and a color coat layer. The color coat layer is dried as above. Optionally, the color coat layer is coated using the same process with a 1-25 micron thick layer (dry basis) of a size layer of thermoplastic polymeric material and dried under the same conditions.

The resulting coated polyester film is then laminated to a flexible thermoformable polymeric sheet material 12 about 125-1250 microns in thickness with the coated side of the polyester film being contacted with the thermoformable polymeric sheet material. The roll of coated polyester film 11 and a roll of the thermoformable polymeric sheet material are fed at a line speed of about 3-15 meters/minute through guide rollers 13 and then through two nip rollers 14 with the top roller heated to a temperature of about 150°-250° C. and using a pressure of about 10-75 kg/linear cm. The resulting laminate is passed around chill roll 15 and the polyester film is separated from the face sheet and wound onto roll 16 and the resulting face sheet is wound into roll 17.

Figure 4:
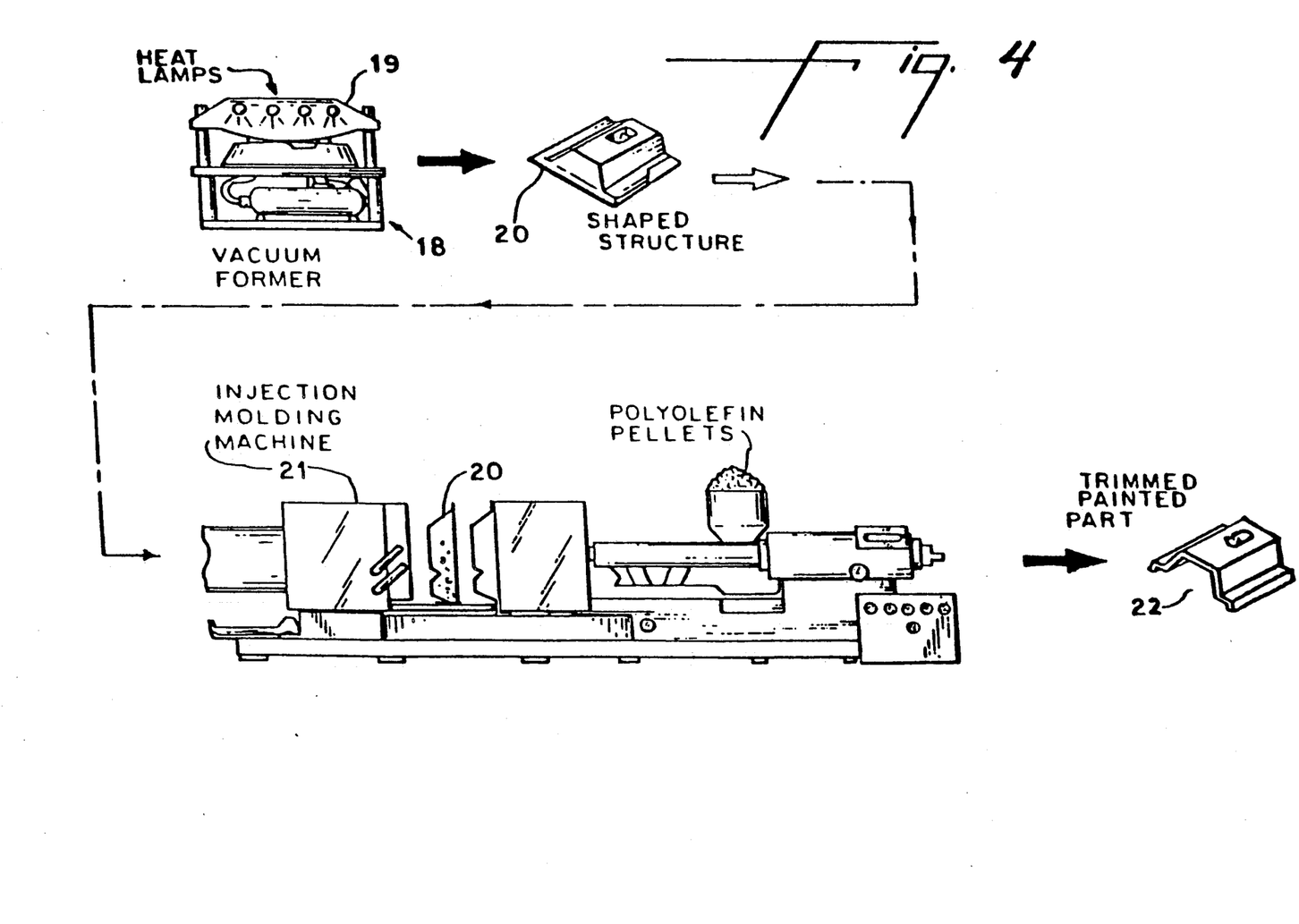
FIG. 4 shows the process for making a composite from the laminate or face sheet.

FIG. 4 shows the formation of the composite structure. A section of the face sheet is cut and then is thermoformed into a shaped structure by placing it in a vacuum former 18 containing heat lamps 19 and the face sheet is heated to about 100°-180° C. The sheet is then vacuum formed into a shaped structure 20 having a painted surface which can be used in an injection molding process or in another molding process to form an auto or truck part. The shaped structure 20 is positioned in a conventional injection molding machine 21 in which a thick layer of a thermoplastic resin is injection molded to form a backing layer about 500-25,000 microns in thickness. The resulting part 22 is useful for autos and trucks and has a surface that is smooth and glossy, has an excellent distinctness of image and good color uniformity and in general meets all the requirements of an automotive finish.

The glossy clear finish and the color coat layer provide the laminate with an exterior decorative finish that is acceptable for automobiles and trucks. The finish must have the following properties to be useful as an automotive or truck finish: a gloss measured at 20° of at least 80 and measured at 60° of at least 90, a distinctness of image (DOI) of at least 80, cleanability, acid spot resistance, hardness of at least 6 Knoops, chip resistance, impact strength of at least 20 inch pounds measured at room temperature and at −29° C., excellent paint adhesion, resistance to water and humidity exposure and excellent outdoor weatherability.

The following is a description of the test methods used to determine the above properties. Certain test methods identified below are publicly available standard industry specifications and test methods which are incorporated herein by this reference.

Gloss is measured by specular reflectance of a beam of light at angles of 20° and 60°. Specular reflectance is measured before the finished painted surface is buffed and waxed. A Byk-Mallinckrodt "multigloss" or "single gloss" gloss meters are used for measuring specular gloss of the finish. These gloss meters give values equivalent to those obtained from ASTM Method D-523-67. The preferred test method is described in GM Test Specification TM-204-A.

Distinctiveness-of-Image (DOI) is a measurement of the clarity of an image reflected by the finish. DOI is measured from the angle of reflection of a light beam from a spherical surface. DOI is measured by the Hunterlab Model No. D47R-6F Doigon Gloss Meter. A test panel is placed on the instrument sensor and the sharpness of the reflected image is measured. Details of the DOI test procedure are described in GM Test Specification TM-204-M.

Cleanability is tested according to GM Test Specification TM 31-11 in which the painted plastic part is subjected to ten rubs with cheesecloth saturated with 9981062 Naphtha or currently used and approved cleaning solvents. There should be no evidence of staining, discoloration, or softening of the painted surface and no evidence of color transfer from the test part to the cloth. One rub consists of one forward and backward motion.

The Acid Spotting Resistance Test requires the painted part to withstand exposure to 0.1 N sulfuric acid for 16 hours without any evidence of staining, discoloration, or softening of the paint.

Hardness is measured by a standard Knoop Hardness Test.

Chip resistance is determined by a Gravelometer Test described in SAE J-400. The painted part as received and after 3 and 6 months Florida exposure, described below, is tested at −23° C. and must have a minimum rating of 8 as determined by F. B. Gravelometer Rating Chart.

Impact strength of a painted part is tested at room temperature by the Gardener Test and by the Rosand Test at −29° C.

Paint Adhesion of a painted part is determined by a standard Tape Adhesion Test described in GM Test Specification TM 55-3. According to this test, a tape is pressed down over an X-shaped cut in the paint coat and the tape is then removed to test the amount of peeling. The test requires a minimum of 99% of the paint remaining in the tape test area.

Resistance to Water and Humidity Exposure is measured by several tests. In one test, the finished part is exposed to 96 hours of humidity exposure at 100% relative humidity and 38° C. in a humidity cabinet defined in GM test specification TM 55-3 and a two-hour water immersion test at 38° C. according to GM test specification TM 55-12. The resulting paint panel should show no evidence of blistering when examined one minute after removal from the test cabinet and shall withstand the Paint Adhesion Test described above. The Paint Adhesion Test is performed within one minute after removal from either test cabinet. In a second test, the painted panel should withstand 15 cycles of the Moisture-Cold Cycle Test defined in GM test specification TM 45-61A, without any visible signs of cracking or blistering. After 15 cycles, the paint panel is exposed to 96 hours of the humidity exposure described above, followed by the Paint Adhesion Test also described above. The panel is expected to pass both tests. The Paint Adhesion Test is performed within one minute after removal from the humidity environment. One cycle consists of 24 hours and 100% relative humidity at 38° C., 20 hours at −23° C., and four hours at room temperature.

For outdoor weatherability, painted panels are exposed for 3 years in Florida facing south in a black box positioned 5° from the horizontal. The painted panels should retain 40% of their original gloss and there should be no blistering or fading of the paint.

The finish of the clear and color coat of the laminate must be sufficiently flexible at thermoforming temperatures and must have sufficient durability to withstand thermoforming and the molding process without embrittling, cracking or otherwise degrading the finish. The finish must be thermoplastic and flexible and must retain its gloss and other appearance properties after processing.

To be useful in the aforementioned process for forming a composite structure, the clear coat of the coating composition must be able to withstand an elongation of at least 100% at a film thickness of about 10-125 microns and at 100° C.

The coating composition used in the process of this invention has a film forming binder content of about 10-70% by weight and correspondingly, about 90-30% by weight of an organic liquid carrier. The composition may be used as a clear coating composition which may contain a small amount of pigment to eliminate color such as yellowing. A clear coat of the composition can be applied to a pigmented basecoat of the composition or a pigmented base coat of another composition to form a clear coat/basecoat finish which is widely used for automobiles and trucks.

The composition may be pigmented and used as a monocoat or as a basecoat of a clear coat/basecoat finish. The composition has excellent adhesion to those polymeric substrates used to form laminates and composites and to a variety of other substrates such as cold rolled steel, phosphatized steel, steel coated with conventional primers such as electrodeposition primers that typically are crosslinked epoxy polyesters; various epoxy resins, alkyd resin repair primers, plastic substrates such as polyester reinforced fiber glass, reaction injection molded urethanes, partially crystalline polyamides and the like.

The film forming binder of the composition contains about 80-99% by weight of a carboxyl functional polyesterurethane and about 1-20% by weight of multifunctional aliphatic, cycloaliphatic or aromatic epoxy compound or a multifunctional organic polyisocyanate having at least three reactive isocyanate groups. Preferably, the binder of the composition contains 85-98% by weight of the carboxyl functional polyesterurethane and about 2-15% by weight of the multifunctional epoxy compound or the multifunctional organic polyisocyanate.

The carboxyl functional polyesterurethane has a weight average molecular weight of about 80,000-200,000 and a number average molecular weight of about 5,000-30,000 measured by gel permeation chromatography using polystyrene as the standard.

The polyesterurethane is the reaction product of a hydroxy functional polyester containing both hydroxy and carboxy functional groups and an organic polyisocyanate. The hydroxy functional polyester is the reaction product of a diol of the formula HOROH where R is an aliphatic, cycloaliphatic or aromatic hydrocarbon radical that has 2-6 carbon atoms and a dicarboxylic acid of the formula $R^1(COOH)_2$ or an anhydride of such an acid where $R^1$ is an aliphatic, cycloaliphatic or aromatic hydrocarbon radical having 6-12 carbon atoms.

The hydroxy functional polyester is formed by conventional techniques in which the diol and acid are charged into a conventional polymerization vessel and reacted at about 150-240° C. for about 12-18 hours. Optionally, an esterification catalyst is used to decrease the reaction time. About 1.2-1.4 equivalents of diol are used with 1 equivalent of acid and preferably, about 1.2-1.3 equivalents of diol with 1 equivalent of acid are used. To insure the formation of a hydroxy functional polyester, an excess of diol is used.

Typical diols that are used to form the polyester are butane diol, hexane diol, cyclohexane dimethanol, ethylene glycol or mixtures of any of the above.

Typical acids that are used to form the polyester are adipic acid, azelaic acid, sebasic acid, dodecane dicarboxylic acid, hexahydrophthalic acid, phthalic acid, terephthalic acid, isophthalic acid or anhydrides of any of these acids.

To form the carboxyl functional polyesterurethane, about 60-90 weight percent, based on the weight of the polyesterurethane, of the hydroxy functional polyester, 1-5% by weight of a hydroxy containing monocarboxylic acid, 5-30% by weight of an organic polyisocyanate are reacted at about 70°-95° C. for about 8-15 hours using conventional solvents and catalysts. Preferably, about 5-20% by weight of a difunctional isocyanate and 0-10% by weight of a trifunctional isocyanate are used. More preferably about 9-15% by weight of a difunctional isocyanate and 5-10% by weight of a trifunctional isocyanate are used.

Typical diisocyanates that can be used include aliphatic, aromatic or cycloaliphatic diisocyanates such as 1,6-hexamethylene diisocyanate, isophorone diisocyanate, 4,4'-biphenylene diisocyanate, toluene diisocyanate, bis cyclohexyl diisocyanate, tetramethyl xylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatodiphenyl ether, and the like. One preferred diisocyanate is isophorone diisocyanate since it forms a coating composition that gives a high quality finish.

Typical trifunctional isocyanate that can be used are triphenylmethane triisocyanate, 1,3,5-benzene triisocyanate, 2,4,6,-toluene triisocyanate, an adduct of trimethylol propane and tetramethyl xylene diisocyanate sold under the tradename "Cythane 3160", "Desmodur" N-3390 which is the trimer of hexamethylene diisocyanate and the like. The preferred triisocyanate is the trimer of hexamethylene diisocyanate.

Typical hydroxy functional carboxylic acids that can be used are as follows: dihydroxy succinic acid, dihydroxy benzoic acid, dimethylol propionic acid and dihydroxy benzoic acid. Dimethylol propionic acid is preferred.

Suitable multifunctional aliphatic, cycloaliphatic or aromatic epoxy compound used in the coating composition include a sorbitol based diepoxide such as GY-358, a cyclohexyl based diepoxide such as Araldite CY-184 and a sebasic acid diglycidyl ester. These epoxy compounds are available from Ciba-Geigy. Other useful epoxy compounds are adipic acid diglycidyl ester, ethylene glycol diglycidyl ether, 1,6-hexanediol diglycidyl ether, hexahydrophthalic anhydride diglycidyl ester and the like. Cyclohexyl based diepoxides are preferred.

Blends of about 0.5-3% by weight based on the weight of the coating composition, of difunctional epoxides and 4-10% by weight of trifunctional epoxides can be used to balance the flexibility and hardness of a finish formed from the coating composition. An example of a trifunctional epoxide is trishydroxyethyl isocyanurate triglycidylether which is an adduct made from "Desmodur" N-3390 (described above) and glycidol. Other useful trifunctional epoxides include pentaerythritol glycidyl ether and triglycidyl tris(2-hydroxyethyl) isocyanurate. Trishydroxyethyl isocyanurate triglycidylether is preferred.

Suitable multifunctional organic polyisocyanate crosslinking agents used in the coating composition include any of the aforementioned trifunctional isocyanates. One preferred polyisocyanate is the trimer of hexamethylene diisocyanate.

Adducts of diisocyanates and multifunctional low molecular weight polyols also can be used. Typically useful adducts include tetramethyl xylene diisocyanate and a trihydric alcohol such as glycerol, trimethylol propane, trimethylol ethane 1,2,6-hexanetriol or a tetrahydric alcohol such as pentaerythritol.

A blocked polyisocyanate can be used. The polyisocyanate is unblocked after application of the coating composition by heating or baking of the finish or layer applied. Typically, useful blocking agents are any of those well known in the art such as alkylketoximes such as methyl ethyl ketoxime, phenols, thiols, tertiary alcohols, secondary aromatic amines and dicarbonyl compounds such as diethyl malonate.

Typical solvents used to form the polyesterurethane and used to prepare the coating composition are as follows: xylene, toluene, methyl ethyl ketone, methyl amyl ketone, methyl isobutyl ketone, propylene carbonate, N-methyl pyrrolidone and the like.

To improve weatherability of the coating composition, in particular a clear coat of the composition, about 0.1-5%, by weight, based on the weight of the binder, of an ultraviolet light stabilizer or screeners or a combination of ultraviolet light stabilizers and screeners can be added to the clear coating composition. Typically useful ultra-violet light stabilizers and screeners are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',2'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of dialyl-4-hydroxy phenyl triazines, hydroxy phenyl-1,3,5-triazine and the like.

Benzoates such as dibenzoate of diphenylol propane, tertiary butyl benzoate of diphenylol propane and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl propionic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama, et al., U.S. Pat. No. 4,061,616, issued Dec. 6, 1977.

When used as a clear coat, the coating composition can also contain transparent pigments to improve durability and weatherability. These transparent pigments having the same or similar refractive index as the binder of the clear coat and are of a small particle size of about 0.015-50 microns. Typical pigments that can be used in the clear coat in a pigment to binder weight ratio of about 1:100 to 10:100 are inorganic siliceous pigments, such as silica pigments and have a refractive index of about 1.4-1.6.

If the coating composition is used as a conventional pigmented monocoat coating composition or as the basecoat of a clear coat/basecoat composition, the composition contains pigments in a pigment to binder weight ratio of about 1:100-200:100. It may be advantageous to use the aforementioned ultraviolet stabilizers and/or screeners in the pigmented composition.

Any of the conventional pigments used in coating compositions can be utilized such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

The pigments are formulated into a mill base by mixing the pigments with a dispersing resin which may be the same as the binder of the composition or may be another compatible dispersing resin or agent. The pigment dispersion is formed by conventional means such as sand grinding, ball milling, attritor grinding, two roll milling. The mill base is then blended with the binder of the composition to form the coating composition.

Other weatherable and durable coating compositions can be used as the clear coat or the basecoat in the process of this invention. A basecoat of thermoplastic fluorinated polymers can be used with the above described polyesterurethane coating composition as the clear coating. Typically useful fluorinated polymers are polyvinyl fluoride, polyvinylidene fluoride (PVDF) or copolymers and terpolymers thereof. A blend of an acrylic resin and one of the above fluoropolymers can be used. One useful blend contains about 50-80% by weight of PVDF and correspondingly 20-50% by weight of polyalkyl methacrylate. Generally, a high molecular weight (MW) PVDF resin is used having a weight average MW of about 200,000-600,000 and a relatively high MW polymethyl or polyethyl methacrylate having a MW of about 50,000-400,000.

The flexible polymeric carrier sheet with the clear layer and the pigmented layer can be laminated directly to the flexible thermoformable polymeric material to form a laminate. The pigmented layer is placed in contact with the flexible thermoformable material. Often it is convenient or necessary to apply a thin size layer or several size layers to the pigmented layer to improve or enhance adhesion to the flexible material. Typical polymeric materials useful for the size layer are iminated polyalkyl acrylate and methacrylates, polyalkyl acrylates, polyalkyl methacrylates, vinyl chloride polymers, polyurethanes, polyimides, and mixtures of the above. One useful polymeric material used for the size layers is a polymer of methyl methacrylate, butyl methacrylate, butyl acrylate, methacrylic acid iminated with propylene imine.

The thermoformable flexible layer of the composite is prepared from standard automotive grade resins. These resins typically are compounded from thermoplastic resins, synthetic rubbers, additives, antioxidants and pigments.

The following are typical rubbers that are compounded with the polypropylene resins: ethylene/propylene rubbers or ethylene/propylene/maleate rubbers. The compounded resins usually contain pigments such as carbon black, calcium carbonate, silica, talc and other filler or reinforcing pigments. Colored pigments described above can also be used. The specific formula for the compounded resins varies according to each supplier but each composition must meet the structural specifications such as flexural modulus, tensile strength, elongation, tear strength and hardness and process constraints such as melt flow and mold shrinkage.

Particularly useful thermoformable resins used for the flexible layer are polyolefins such as polyethylene, polypropylene, acrylonitrile/butadiene/styrene polymers, polystyrene, styrene/acrylonitrile copolymers and glycol modified polyethylene terephthalate. Typically, cyclohexane dimethanol modified polyethylene terephthalate can be used.

The layer of flexible thermoformable polymeric material can be formed into a 125-1250 micron thick sheet using conventional techniques and equipment such as extrusion techniques and equipment. Resins with melt flow indexes of about 0.5-8.0 g/10 min. can be used but resins with melt flow indexes of about 0.5-2.0 g/10 min. are preferred.

The conditions used to form the flexible sheet are such that a sheet with a smooth "Class A" surface is formed and the sheet has low internal stresses. Stresses in the flexible sheet are measured by cutting a 4×4 inch section of the sheet and laying the section on a flat surface. The edges and the corners of the section should lie flat for an unstressed film.

The resin used to form the rigid layer of the composite is an automotive quality resin generally having a flexural modulus of about 175-2100 MPa melt flow of about 0.5-8.0 g/10 min. Preferably, the resin has a melt flow of about 4.0-8.0 g/10 min. Any of the aforementioned resin used for the flexible layer can be used that have the above properties.

Also, other resinous materials can be used for the rigid layer such as RIM, reinforced injection molded materials which crosslink on curing. Since the surface of the composite of this invention is determined by the surface of the flexible layer, only the flexible layer need be of a high quality resin while the rigid layer of the composite can be of a lower quality resin. For example, the rigid layer may contain gel particles which would not affect the appearance or the structural integrity of a resulting part formed from the composite.

The ability to separate the surface characteristics from the resin used to form the rigid layer of the composite allows for the formation of greatly improved parts. For example, fiberglass reinforced or other filler reinforced resins can be used for the resin for the rigid layer of the composite and stronger more rigid parts can be made than has heretofore been possible.

The process of this invention provides automotive manufacturers with many advantages over prior art processes. Adhesion problems within the recessed portions of a part are minimized, solvent emissions associated with spray painting are eliminated, the need for expensive hangers and jigs to maintain shape of a plastic part during baking of an applied paint are eliminated and the need for a primer which is required with a conventional paint spraying process also is eliminated. Additionally, the composite formed by the novel process has a unique set of characteristics that make it superior to conventional injection molded and spray painted parts.

The following Examples illustrate the invention. All parts and percentages are on a weight basis unless otherwise indicated and molecular weights, number average $M_n$ and weight average $M_w$ are determined by gel permeation chromatography using polystyrene as a standard.

EXAMPLE 1

A hydroxy functional polyester was prepared by charging the following constituents into a polymerization vessel equipped with a heating mantle, reflux condenser, thermometer, nitrogen inlet and stirrer:

|  | Parts by Weight |
|---|---|
| Portion 1 | |
| 1,4-Cyclohexane dimethanol | 1897.1 |
| Hexahydrophthalic anhydride | 1254.6 |
| Dodecanedioic acid | 212.9 |
| Adipic acid | 135.3 |
| Toluene | 70.0 |
| Portion 2 | |
| Xylene | 500.0 |
| Methyl ethyl ketone | 300.0 |

|  | Parts by Weight |
| --- | --- |
| Total | 4369.9 |

Portion 1 was charged into the polymerization vessel and heated under nitrogen to 240° C. and held at this temperature. Water was removed until the acid number of the mixture reached 4. Portion 2 was then added and the resulting polyester solution was cooled to room temperature. The resulting polymer solution had the following characteristics:

| Gallon weight | 8.8 lbs/gal |
| --- | --- |
| % Weight solids | 79% |
| % Volume solids | 72.8% |
| Hydroxy No. of polymer | 100–120 |
| $M_w$ of polymer | 2300 |
| $M_n$ of polymer | 800 |

A polyesterurethane polymer solution was prepared by charging the following constituents into a polymerization vessel equipped as above:

|  | Parts by Weight |
| --- | --- |
| Portion 1 |  |
| Hydroxy functional polyester solution (prepared above) | 321.3 |
| Dimethyl propionic acid | 5.3 |
| Dibutyl tin dilaurate | 0.6 |
| Exxate 700 (Acetic acid ester of a C7 alcohol) | 216.6 |
| Portion 2 |  |
| Isophorone diisocyanate | 37.1 |
| Exxate 700 | 30.1 |
| Portion 3 |  |
| Desmodur N-3390 (trimer of hexamethylene diisocyanate) | 30.6 |
| Exxate 700 | 42.1 |
| Portion 4 | 114.3 |
| Exxate 700 |  |
| Total | 798.0 |

Portion 1 was charged into the polymerization vessel and heated to 70° C. Portion 2 was added over a 40 min. period. The reaction mixture was held at 70° C. until all of the isocyanate had reacted, approximately 5 hours. Portion 3 was then added over 30 min. and the reaction mixture held at 70° C. until all of the isocyanate was consumed and then Portion 4 was added.

The resulting polyesterurethane had the following characteristics:

| Gallon weight | 8.0 lbs/gal |
| --- | --- |
| % weight solids | 40.2% |
| Acid No. | 8.9 |
| $M_n$ of polymer | 11,000 |
| $M_w$ of polymer | 153,091 |

Clear Coating Composition 1

A clearcoating composition was prepared by thoroughly blending together the following ingredients:

|  | Parts by Weight |
| --- | --- |
| Polyesterurethane polymer solution (prepared above) | 50.000 |
| "Desmodur" N-3390 | 1.770 |

|  | Parts by Weight |
| --- | --- |
| "Fluorad" FC-430 (Nonionic fluorinated alkyl ester) | 0.017 |
| "Tinuvin" 1130 [reaction product of beta-3- (2H benzotriazol-2-yl) -4-hydroxy-5-tert-butyl phenyl propionic acid methyl ester and polyethylene glycol 300] | 0.510 |
| "Tinuvin" 292 [bis(1,2,2,6,6-pentamethyl-4-piperidinyl sebacate)] | 0.230 |
| Toluene | 6.300 |
| Total | 58.827 |

Silver Metallic Basecoat

A silver metallic basecoat was prepared by thoroughly blending together the following ingredients:

|  | Parts by Weight |
| --- | --- |
| Polyesterurethane polymer solution (prepared above) | 60.00 |
| Aluminum paste (62% aluminum flake in mineral spirits/naphthol) | 5.60 |
| "Fluorad" FC-430 | 0.02 |
| "Desmodur" N-3390 | 0.52 |
| Acrylic Microgel - 20% solids in organic solvent | 7.29 |
| Total | 73.43 |

Laminates were formed by following the following procedure:

Clear Coating Composition 3 was coated onto a 50 micron thick high gloss "Mylar" polyester film by a reverse roll coater (illustrated in FIG. 2). The coating on the polyester sheet was cured by passing it through a multi-zone air drying oven having three heating zones spaced apart axially along the length of the carrier, with each drying zone having a progressively higher temperature. The coated polyester sheet was passed through the heating zones at a line speed of about 8 meters per minute; total oven length was about 40 meters. Temperatures of the three heating zones as follows: Zone 1: 38° C., Zone 2: 93° C., Zone 3: 150° C.

The above prepared Silver Metallic Basecoat was applied to the clear coating by using the above coating procedure to provide a basecoat about 15–20 microns thick.

The color coat of the resulting clear coat/basecoat coated polyester film was laminated to a 500 micron thick ABS backing sheet coated with an iminated acrylic size as illustrated in the laminating operation of FIG. 3. In the laminating operation, the backing sheet and the paint coated polyester film carrier are run at a lineal speed of 5 meters per minute, and the laminating drum is operated at a temperature of 177° C. and a force of about 54 kg/lineal cm is applied to form the face sheet.

The above iminated acrylic size is a 35% solids solution in 70/30 isopropanol/toluene solvent of a polymer of methyl methacrylate/butyl methacrylate/butyl acrylate/methacrylic acid (35.3/45.7/9/10) iminated with propylene imine.

The resulting face sheet is stripped from the polyester film and thermoformed into a complex three-dimension shape (illustrated in FIG. 4). In the thermoforming process, the face sheet is heated to a temperature of about 121° C. to soften the face sheet.

The heated face sheet is placed over a pressure assist vacuum former buck and a vacuum is drawn against the buck on the ABS side of the face sheet and 2.1 kg/cm² gauge of air pressure is applied on the clear coat side of the laminate to form the heated face sheet into the three dimensional shape structure.

The resulting thermoformed laminate is trimmed up then to fit in the mold cavity of a plastic injection molding machine (see FIG. 4). A composite structure is then formed. ABS resin is injected into the mold behind the thermoformed laminate fusing the resin to the ABS base of the laminate to form the composite about 2.5–3.75 mm thick. The mold is operated at the normal melt temperature for the resin. The structure formed is an integral plastic composite with a defect-free paint coat on the exterior surface of the composite and has a desirable automotive quality appearance i.e., automotive level of gloss and DOI and excellent physical properties i.e., hardness, acid and base resistance.

EXAMPLE 2

A polyesterurethane polymer solution was prepared by charging the following constituents into a polymerization vessel equipped as in Example 1:

|  | Parts by Weight |
|---|---|
| Portion 1 | |
| Hydroxy functional polyester solution (prepared in Example 1) | 400.0 |
| Dimethylol propionic acid | 8.6 |
| Methyl ethyl ketone | 250.0 |
| Portion 2 | |
| Dibutyl tin dilaurate | 0.8 |
| Isophorone diisocyanate | 64.6 |
| "Desmodure" N-3390 (trimer of hexamethylene diisocyanate) | 17.5 |
| Total | 741.5 |

Portion 1 was charged into the polymerization vessel and heated to its reflux temperature and held at this temperature for about 30 min. to remove any trace of water. The reaction mixture was cooled to 80° C. and Portion 2 was added at a uniform rate over a 1 hour period. The reaction mixture was held at 80° C. until all of the isocyanate was consumed. The resulting polyesterurethane solution had the following characteristics:

| Gallon weight | 8.2 lbs/gal |
|---|---|
| % Weight solids | 54.7% |
| % Volume solids | 45.0% |
| Acid No. | 9–13 |
| Inherent Viscosity | 0.156–0.165 Dl/gm |
| $M_n$ of polymer | 7,000 |
| $M_w$ of polymer | 84,000 |

Clear Coating Composition 2

A clear coating composition was formulated by thoroughly blending the following constituents:

|  | Parts by Weight |
|---|---|
| Polyesterurethane polymer solution (prepared above) | 200.0 |
| Araldite CY-184 (epoxy resin from Ciba-Geigy diglycidyl ester of hexahydro phthalic anhydride) | 8.7 |
| "Tinuvin" 292 [bis(1,2,2,6,6-pentamethyl-4-piperidinyl sebacate)] | 1.3 |
| "Tinuvin" 1130 [reaction product of beta-3-(2H benzotriazol-2-yl)-4-hydroxy-5-tert-butyl phenyl propionic acid methyl ester and polyethylene glycol 300] | 3.7 |
| Methyl ethyl ketone | 100.0 |
| Total | 313.7 |

Silver Metallic Basecoat 2

|  | Parts by Weight |
|---|---|
| Portion 1 | |
| Polyesterurethane polymer solution (prepared above) | 80.00 |
| Toluene | 20.00 |
| Aluminum paste (62% aluminum flake in mineral spirits/naphthol) | 9.40 |
| Portion 2 | |
| Trifunctional epoxide - described above | 1.54 |
| Surfactant (Resiflow S) | 0.10 |
| Total | 111.04 |

Portion 1 was charged into a mixing vessel and thoroughly mixed and then portion 2 was added and mixed with portion 1 to form a basecoating composition having a pigment to binder ratio of 15/100.

A laminate can be formed by following the process and procedures of Example 1 by substituting the above prepared Clear Coating Composition 2 and Silver Metallic Basecoat 2 for the Clear Coating Composition 1 and Silver Metallic Basecoat 1 of Example 1, respectively. The resulting laminate can be expected to have an automotive quality appearance, i.e., automotive level of gloss and DOI and excellent physical properties i.e., hardness, acid and base resistance.

We claim:

1. A process for forming a composite useful as an exterior vehicle body part comprising the following steps:
   a. applying a layer of a coating composition to a flexible polymeric carrier sheet having a smooth glossy surface and drying said layer;
   b. laminating with heat and pressure the flexible polymeric carrier sheet with the coating layer to a flexible thermoformable polymeric material with the coating layer of the sheet being adhered to the thermoformable polymeric material to form a laminate;
   c. removing the polymeric carrier sheet from the laminate whereby the exterior surface of the coating layer retains the glossy surface transferred to it from the polymeric carrier sheet;
   d. thermoforming the laminate to form a three dimensionally shaped preform;
   e. adhering the flexible polymeric material of the preform to a rigid synthetic resinous substrate to form a composite useful as an exterior vehicle body part;

wherein the coating composition used in the process comprises about 10–70% by weight binder solids and correspondingly about 90–30% by weight organic liquid carrier, wherein
   the binder consists essentially of
   (1) a carboxyl functional polyesterurethane having a weight average molecular weight of about 80,000 to 200,000 and is a reaction product of a hydroxy functional polyester, a hydroxy containing carboxylic acid and an organic polyisocyanate, wherein the hydroxy functional polyester is the reaction product of a diol of the formula HOROH and dicarboxylic acid of the formula R¹(COOH)₂ or an anhydride of such an acid where R is an aliphatic, cycloaliphatic or aromatic hydrocarbon radical having 2-6 carbon and R¹ is an aliphatic, cycloaliphatic or aromatic hydrocarbon radical having 6-12 carbon atoms and (2) multifunctional crosslinking agent selected from the group consisting of a multifunctional aliphatic, cycloaliphatic or aromatic epoxy compound or a multifunctional organic polyisocyanate having at least three reactive isocyanate groups.

2. The process of claim 1 in which the laminating step b. is carried out at a temperature of about 150°-250° C. and at a pressure of about 10-75 kg/linear cm.

3. The process of claim 1 in which the binder of the coating composition comprises about 80-99 percent by weight of the carboxyl functions polyesterurethane and about 1-20 percent by weight of the multifunctional crosslinking agent.

4. The process of claim 2 in which the hydroxy functional polyester of the coating is the reaction product of about 1.2-1.4 equivalents of diol for 1 equivalent of dicarboxylic acid.

5. The process of claim 3 in which the polyesterurethane of the coating composition is the reaction product of about 60-90 percent by weight of the hydroxy functional polyester, about 1-5 percent by weight of the hydroxy containing carboxylic acid containing one carboxyl group and two hydroxyl groups, and about 5-30 percent by weight of the organic polyisocyanate.

6. The process of claim 5 in which the diol used to form the hydroxy functional polyester that is used to form the polyesterurethane is from the group of butane diol, hexane diol, cyclohexane dimethanol, ethylene glycol or mixtures of any of the above.

7. The process of claim 5 in which the dicarboxylic acid used to form the hydroxy functional polyester that is used to form the polyesterurethane is from the group of adipic acid, azelaic acid, sebasic acid, dodecane dicarboxylic acid, hexahydrophthalic acid or its anhydride or mixtures of any of the above.

8. The process of claim 5 in which the hydroxy containing carboxylic acid used to form the polyesterurethane is from the group of dihydroxy succinic acid, dihydroxy benzoic acid, dimethylol propionic acid, dihydroxy propionic acid and any mixtures thereof.

9. The process of claim 5 in which the organic polyisocyanate used to form the hydroxy functional polyester that is used to form the polyesterurethane comprises an aliphatic, cycloaliphatic or aromatic diisocyanate and up to 10 percent by weight, based on the weight of the polyesterurethane, of an organic triisocyanate.

10. The process of claim 9 in which the organic polyisocyanate is from the group of hexamethylene diisocyanate, isophorone diisocyanate, biphenylene diisocyanate, toluene diisocyanate, bis cyclohexyl diisocyanate, tetramethyl xylene diisocyanate, ethylethylene diisocyanate, dimethylethylene diisocyanate, methyltrimethylene diisocyanate, cyclopentylene diisocyanate, cyclohexylene diisocyanate, phenylene diisocyanate, naphthalene diisocyanate, bis-(isocyanatocyclohexyl)-methane and diisocyanatodiphenyl ether.

11. The process of claim 9 in which the organic polyisocyanate comprises a blend of about 9-15% by weight of an organic diisocyanate and 5-10% by weight of an organic triisocyanate.

12. The process of claim 11 in which the organic triisocyanate is from the group of triphenylmethane triisocyanate, benzene triisocyanate, toluene triisocyanate, an adduct of trimethylol propane and tetramethyl xylene diisocyanate, the trimer of hexamethylene diisocyanate and mixtures thereof.

13. The process of claim 11 in which the organic diisocyanate is isophorone diisocyanate and the organic triisocyanate is the trimer of hexamethylene diisocyanate.

14. The process of claim 5 in which the hydroxy functional carboxylic acid used to form the polyesterurethane is from the group of dihydroxy succinic acid, dihydroxy benzoic acid, dimethylol propionic acid, dihydroxy benzoic acid and any mixtures thereof.

15. The process of claim 3 in which the multifunctional crosslinking agent is an epoxy compound which comprises a multifunctional aliphatic, cycloaliphatic or aromatic epoxy compound.

16. The process of claim 14 in which the epoxy compound is from the group of sorbitol based diepoxide, cyclohexyl based diepoxide, sebasic acid diglycidyl ester, adipic acid diglycidyl ester, ethylene glycol diglycidyl ether, hexanediol diglycidyl ether, hexahydrophthalic anhydride diglycidyl ester and any mixtures thereof.

17. The process of claim 15 in which the epoxy compound comprises a blend of 0.5-3% by weight of a difunctional epoxy compound and 4-10% by weight of a trifunctional epoxy compound.

18. The process of claim 17 in which the trifunctional epoxy compound is from the group of trishydroxyethyl isocyanurate triglycidylether, pentaerythritol glycidyl ether, triglycidyl tris (2-hydroxyethyl)isocyanurate and any mixtures thereof.

19. The process of claim 5 in which the polyesterurethane is the reaction product of a hydroxy functional polyester of cyclohexane dimethanol, hexahydrophthalic anhydride, dodecanedioic acid and adipic acid and dimethylol propionic acid and isophorone diisocyanate and trimer of hexamethylene diisocyanate and the epoxy compound is cyclohexyl based diepoxide.

20. The process of claim 5 in which the polyesterurethane is the reaction product of a hydroxy functional polyester of cyclohexane dimethanol, hexahydrophthalic anhydride, dodecanedioic acid and adipic acid and dimethylol propionic acid and isophorone diisocyanate and trimer of hexamethylene diisocyanate and the epoxy compound is a trifunctional epoxide of an adduct of trimer of hexamethylene diisocyanate and glycidol.

21. The process of claim 3 in which the multifunctional crosslinking agent is a multifunctional organic polyisocyanate which comprises a multifunctional aliphatic, cycloaliphatic or aromatic polyisocyanate.

22. The process of claim 21 in which the multifunctional polyisocyanate is from the group of trimer of hexamethylene diisocyanate, triphenylmethane triisocyanate, benzene triisocyanate, toluene triisocyanate, adduct of trimethylol propane and tetramethylxylene diisocyanate.

23. The process of claim 21 in which the polyisocyanate is blocked with an organic blocking agent.

24. The process of claim 5 in which the polyesterurethane is the reaction product of a hydroxy functional polyester of cyclohexane dimethanol, hexahydrophthalic anhydride, dodecanedioic acid and adipic acid and dimethylol propionic acid and isophorone diisocyanate and trimer of hexamethylene diisocyanate and the organic polyisocyanate crosslinking agent is a trimer of hexamethylene diisocyanate.

25. The process of claim 1 in which the flexible polymeric sheet is a thin polyester film.

26. The process of claim 1 in which a clear layer of the coating composition of claim 1 is applied to the flexible carrier and at least partially dried and then a pigmented layer of a coating composition is applied to the clear layer and dried.

27. The process of claim 26 in which the coating composition of the pigmented layer comprises binder of a fluorocarbon polymer and an acrylic polymer.

28. The process of claim 27 in which the binder of the pigmented layer comprises polyvinylidene fluoride and polyalkyl methacrylate.

29. The process of claim 26 in which the clear layer and pigmented layer form the exterior surface of the composite and have gloss of at least 80 measured at 20° and a distinctness of image of at least 80.

30. The process of claim 26 in which the coating composition of the clear layer contains additives of components selected from the group consisting of ultraviolet light screeners, ultraviolet light stabilizers, microgel, flow control agent and mixtures of any or all of the above.

31. The process of claim 26 in which the coating composition of the pigmented layer contains components selected from the group consisting of ultraviolet light screeners, ultraviolet light stabilizers, microgel, flow control agent and mixtures of any or all of the above and contains pigment in pigment to binder ratio of about 1:100 to 200:100 wherein the binder comprises the film forming constituents of the coating composition.

32. The process of claim 26 in which at least one thin size layer is applied to the pigmented layer and is dried; wherein the size layer is selected from the group consisting of polyalkyl acrylates, polyalkyl methacrylates, iminated polyalkyl acrylates or methacrylates, vinyl chloride polymers, polyurethanes, polyimides, and any mixtures thereof.

33. The process of claim 1 in which the flexible thermoformable polymeric material comprises a polymer selected from the group consisting of thermoplastic polyolefins, acrylonitrile-butadiene-styrene terpolymers, polystyrene and styrene-acrylonitrile copolymers mixtures thereof.

34. The process of claim 33 in which the flexible thermoformable polymeric material comprises of polyolefin of polypropylene or polyethylene having a melt flow of about 0.5-2.0 g/10 min.

35. The process of claim 33 in which the flexible layer of thermoformable polyolefin comprises an extruded sheet of a compounded mixture of polypropylene, a synthetic elastomeric resin, pigments and additives.

36. The process of claim 33 in which the flexible thermoformable polymer material comprises a sheet of acrylonitrile-butadiene-styrene polymer.

37. The process of claim 1 in which the rigid synthetic resinous substrate comprises a thermoformable polymeric material having a flexural modulus of about 175-2100 MPa and a melt flow rate of about 0.5-8.0 g/10 min. and is selected from the group consisting of thermoplastic polyolefin, acrylonitrile-butadiene-styrene polymer, polystyrene and styrene-acrylonitrile copolymers and mixtures thereof.

38. The process of claim 37 in which the thermoformable polymeric material of the rigid synthetic resinous substrate is injection molded in contact with the laminate to form the composite.

39. The process of claim 38 in which the rigid synthetic resinous substrate comprises thermoformable polyolefin of polyethylene or polypropylene.

40. The process of claim 38 in which the rigid synthetic substrate comprises acrylonitrile-butadiene-styrene polymer.

41. The process of claim 26 that forms a composite useful as an exterior vehicle part comprising the following layers of components:
   a. 10-125 micron thick layer of a glossy clear thermoplastic finish of a coating composition bonded firmly to
   b. 5-75 micron thick layer of a thermoplastic pigment containing layer of the coating composition of claim 1 bonded to
   c. 125-1250 micron thick layer of a flexible thermoformable material that is bonded to
   d. 500-25,000 micron thick layer of a rigid synthetic resinous material.

42. A process for forming a laminate useful for making an exterior vehicle body part comprising the following steps:
   a. applying a layer of a coating composition to a flexible polymeric carrier sheet having a smooth glossy surface and drying said layer;
   b. laminating with heat and pressure the flexible polymeric carrier sheet with the coating layer to a flexible thermoformable polymeric material with the coating layer of the sheet being adhered to the thermoformable polymeric material to form a laminate;

wherein the coating composition used in the process comprises about 10-70% by weight binder solids and correspondingly about 90-30% by weight organic liquid carrier, wherein
   the binder consists essentially of
   (1) a carboxyl functional polyesterurethane having a weight average molecular weight of about 80,000 to 200,000 and is reaction product of a hydroxy functional polyester, a hydroxy containing carboxylic acid and an organic polyisocyanate, wherein the hydroxy functional polyester is the reaction product of a diol of the formula HOROH and dicarboxylic acid of the formula $R^1(COOH)_2$ or an anhydride of such an acid where R is an aliphatic, cycloaliphatic or aromatic hydrocarbon radical having 2-6 carbon and $R^1$ is an aliphatic, cycloaliphatic or aromatic hydrocarbon radical having 6-12 carbon atoms and
   (2) multifunctional crosslinking agent selected from the group consisting of a multifunctional aliphatic, cycloaliphatic or aromatic epoxy compound or a multifunctional organic polyisocyanate having at least three reactive isocyanate groups.

43. The process of claim 42 in which the laminate comprising the following layers of components:
   a. 10-125 micron thick layer of a glossy clear thermoplastic finish bonded firmly to
   b. 5-75 micron thick layer of a thermoplastic pigment containing layer of the coating composition bonded to
   c. 125-1250 micron thick layer of a flexible thermoformable material.

* * * * *